United States Patent [19]
Gregory et al.

[11] Patent Number: 5,319,214
[45] Date of Patent: Jun. 7, 1994

[54] INFRARED IMAGE PROJECTOR UTILIZING A DEFORMABLE MIRROR DEVICE SPATIAL LIGHT MODULATOR

[75] Inventors: Don A. Gregory; David J. Lanteigne, both of Huntsville; Joseph J. Booth, Gurley; Scottie B. Mobley, Huntsville, all of Ala.

[73] Assignee: The United States of America as represented by the Secretary of the Army, Washington, D.C.

[21] Appl. No.: 863,908

[22] Filed: Apr. 6, 1992

[51] Int. Cl.$^5$ .............................................. G09G 3/20
[52] U.S. Cl. ............................... 250/504 R; 359/291
[58] Field of Search .............. 250/504 R; 359/291, 359/292; 346/160, 108; 340/783, 795

[56] References Cited

U.S. PATENT DOCUMENTS

| | | | |
|---|---|---|---|
| 4,087,810 | 5/1978 | Hung et al. | 359/291 |
| 4,571,603 | 2/1986 | Hornbeck et al. | 346/160 |
| 4,638,309 | 1/1987 | Ott | 359/291 |
| 4,712,888 | 12/1987 | Brooks | 250/332 |
| 4,815,799 | 3/1989 | Goldstein et al. | 359/352 |
| 5,097,139 | 3/1992 | Foster | 250/504 R |
| 5,105,207 | 4/1992 | Nelson et al. | 346/160 |

OTHER PUBLICATIONS

"Deformable Mirror Device Spatial Light Modulators and Their Applicability to Optical Neural Networks," by Dean R. Collins, et al. *Applied Optics*, vol. 28, No. 22, Nov. 15, 1989.

"Optical Characteristics of a Deformable-Mirror Spatial Light Modulator," by Don A. Gregory et al. *Optics Letters*, vol. 13, No. 1, Jan. 1988.

*Primary Examiner*—Jack I. Berman
*Assistant Examiner*—Jim Beyer
*Attorney, Agent, or Firm*—Freddie M. Bush; Hay K. Chang

[57] ABSTRACT

The mirror elements mirror device spatial light modulator are selectively deflected. Such deflection causes incident infrared radiation to be reflected in selected directions. The number of deflected mirror elements as well as the degree of deflection determines the amount of reflected radiation which travels through an aperture and is collimated by suitable imaging optics, thus creating an infrared image that appears to be at infinity.

3 Claims, 5 Drawing Sheets

INFRARED IMAGE PROJECTOR UTILIZING A DEFORMABLE MIRROR DEVICE SPATIAL LIGHT MODULATOR

DEDICATORY CLAUSE

The invention described herein may be manufactured, used, and licensed by or for the Government for governmental purposes without the payment to us of any royalties thereon.

BACKGROUND OF THE INVENTION

Numerous military systems employ sensors which image in the infrared. A thorough testing of these sensors requires a controlled generation of simulated, yet realistic scenes that can be produced in a laboratory or indoor test range. The creation of artificial scenes in the infrared is technically difficult and the current state of the art is not as sophisticated as, for example, the art of creating artificial scenes in visible light where numerous types of projectors, cathode ray tubes, plasma displays, and liquid crystal displays are available. In fact, a technology of creating artificial scenes in the infrared which is available from CI Systems, Inc. is representative of the current commercial state of the art. The CI Systems technology achieves the simulation of infrared scenes by moving perforated puppets and silhouettes in front of a thermal source of radiation. Some other current techniques include arrays of small resistors which are made to glow from the heat induced by an electric current applied to them and the use of liquid crystal devices to modulate a beam of infrared radiation.

SUMMARY OF INVENTION

The infrared image projector utilizes the deformable mirror device spatial light modulator, herein referred to as "DMD", to reflect infrared radiation impinging on its mirror elements, thereby creating infrared images, by selectively manipulating the deflection of the mirror elements. The reflected radiation from undeflected mirror elements is then collimated and transmitted by suitable infrared-imaging optics to present to the sensor under test an infrared image appearing to be at infinity.

DESCRIPTION OF THE PREFERRED EMBODIMENT

The deformable mirror device spatial light modulator, referred to herein as "DMD", has been developed by Texas Instruments and the United States Army Missile Command. Different versions of the DMD exist; however, all consist of an array of microscopic mirror elements, each of which can be deflected by a predetermined angle independently of any other mirror element by the application of an electrical signal, as is explained in "[O]ptical characteristics of a deformable—mirror spatial light modulator," by Don A. Gregory, et al, *Optics Letters*, Vol. 13, No. 1, January 1988. One peculiar characteristic of the DMD is the analog modulation capability that is inherent in the DMD itself.

Even though several versions of the DMD exist which are suitable for use in the infrared image projector, one particular version of the DMD, the torsion beam DMD, is used herein to illustrate the operation of the infrared image projector, which incorporates the DMD. The structure and operation of the torsion beam DMD is explained in "[D]eformable mirror device spatial light modulators and their applicability to optical neural networks," by Dean R. Collins, et al, *Applied Optics*, Vol. 28, No. 22, Nov. 15, 1989.

Figure 1:
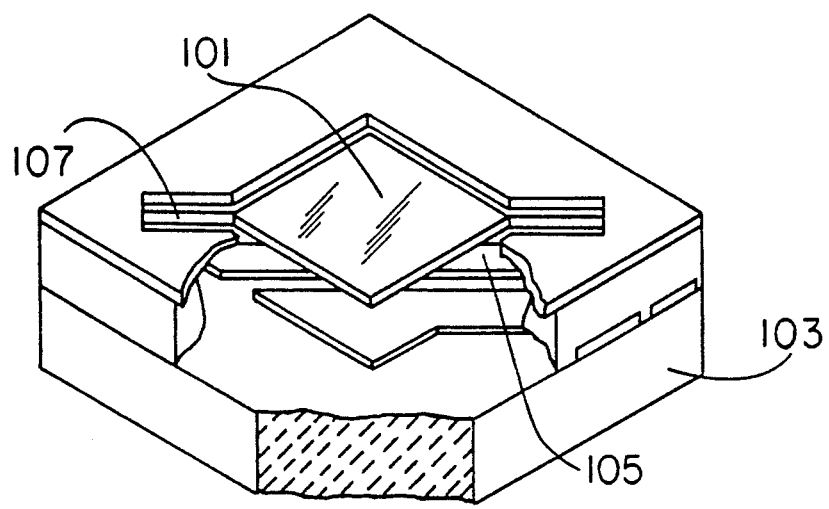
FIG. 1 shows the structural details of a representative mirror element of a torsion beam DMD.
Figure 2:
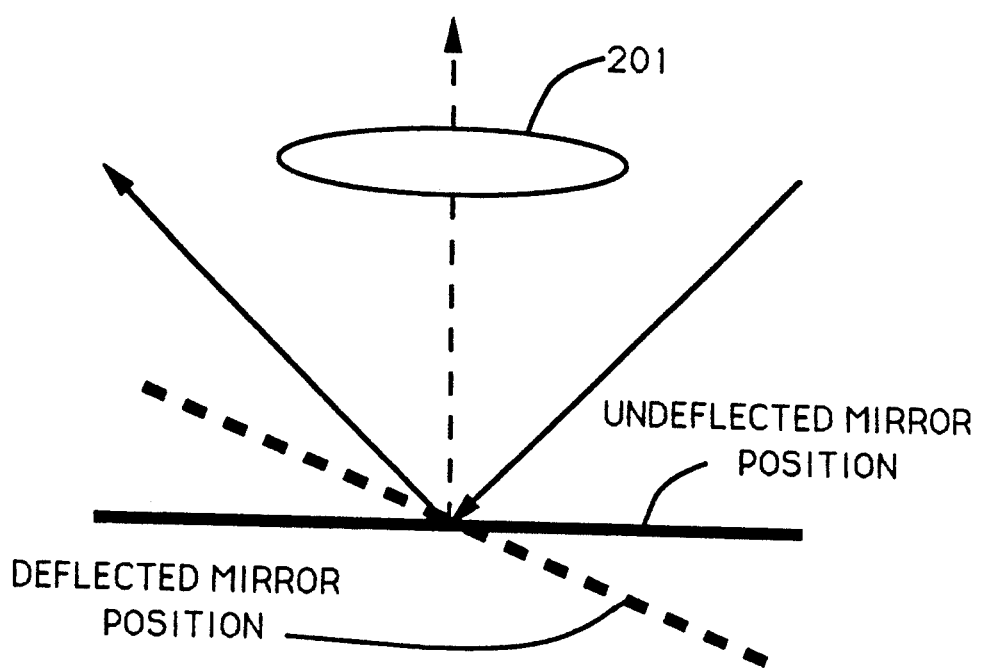
FIG. 2 illustrates and compares the reflected radiation paths from a deflected mirror element and an undeflected mirror element of a DMD.

In essence, the torsion beam DMD is a square array of 128 by 128 microscopic mirror elements, each mirror element being about 19 microns wide, which twist about their axes in response to voltage applied to them. Referring now to drawings wherein like numbers refer to like parts, FIG. 1 shows a representative mirror element of the torsion beam DMD and its associated structures. Each mirror 101 and the substrate 103 over which it is suspended are fabricated from a silicon wafer in the same manner as are integrated circuit chips. Underlying each mirror is address electrode 105. Application of a voltage to the address electrode develops an electrostatic force which causes the mirror to twist about torsion rod 107, thus reflecting any incident light in a particular direction. The amount of voltage applied to the address electrode determines the field strength of the airgap capacitor which is comprised of the mirror and the underlying address electrode. The level of field strength, in turn, determines the degree of the mirror deflection. By controlling the applied voltage, the degree of deflection can thus be manipulated so that anywhere from none to all of incident light is reflected to enter the entrance pupil of projection lens 201 as shown in FIG. 2. In FIG. 2, where the arrows indicate the beam paths of the incident and reflected light, the solid line represents a mirror position for allowing none of the reflected light to enter the entrance pupil of the projection lens and the solid arrows represent the radiation incident on and reflected from the mirror. This mirror position results in total darkness. In the same Figure, the dotted line represents a mirror position for allowing all of the reflected light to enter the entrance pupil and the dotted arrows represent the corresponding incident and reflected radiation. This second mirror position results in a bright image. Thus, naturally, different mirror positions between the solid and dotted lines would correspond to different gray levels in the brightness of the achieved image.

Figure 3:
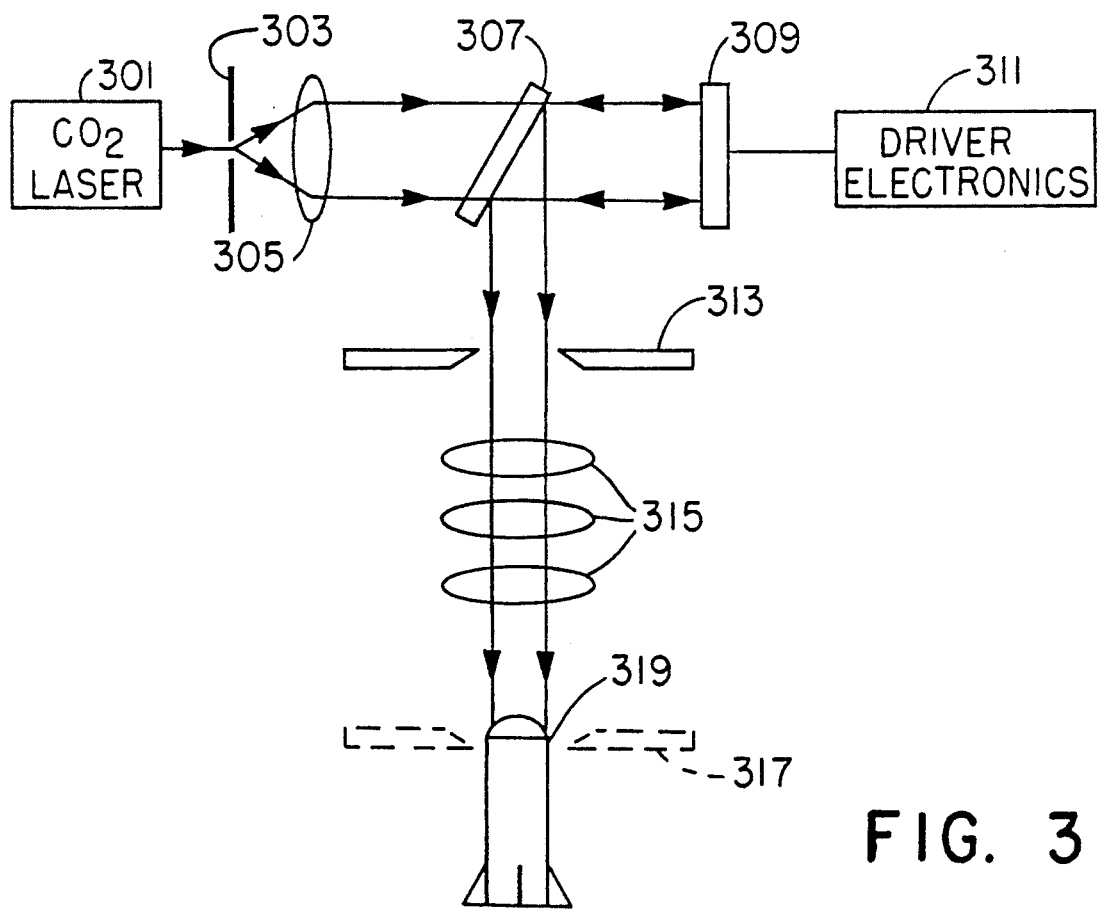
FIG. 3 is a depiction of a preferred embodiment of the infrared image projector.

The above-described unique properties of the DMD are utilized in the infrared image projector, a preferred embodiment of which is shown in FIG. 3.

Figure 4:
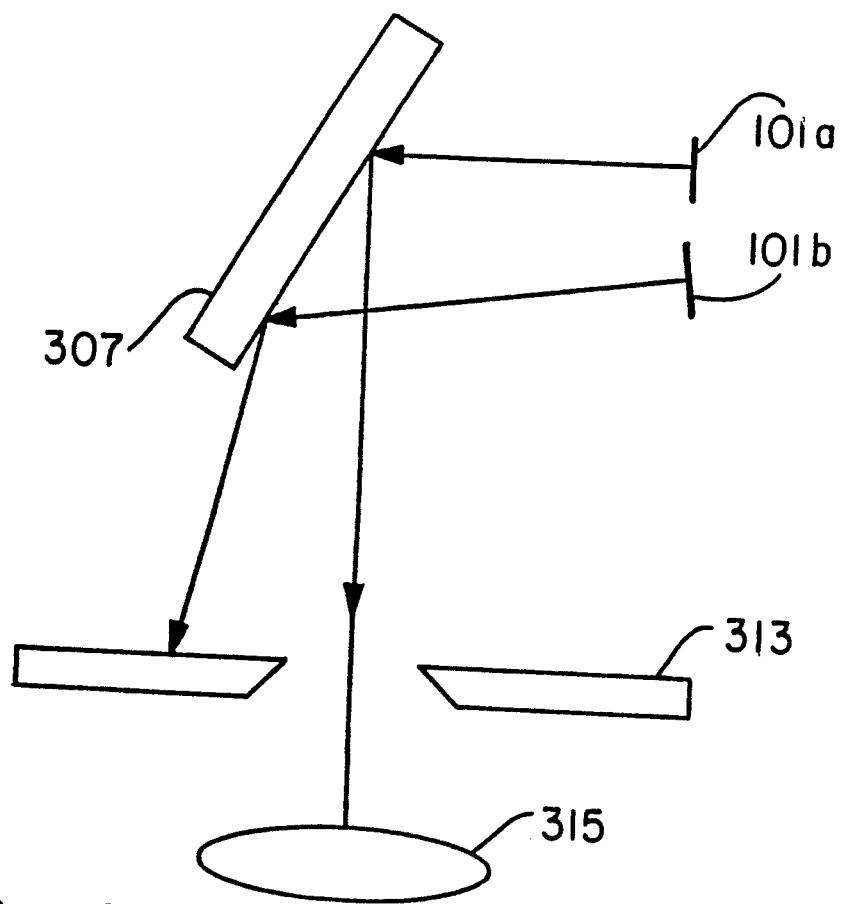
FIG. 4 is a detailed showing of how the aperture controls the amount of transmissable reflected radiation.

In FIG. 3, infrared radiation from a suitable source such as $CO_2$ laser 301 is transmitted through spatial filter 303 and impinges on collimating lens 305. Thence the collimated beam travels to beamsplitter 307 which transmits the radiation further to deformable mirror device (DMD) 309. Driver electronics 311, details of which are explained hereinbelow, are coupled to DMD 309 and manipulate selectively the deflection of the mirror elements of the DMD. This selective deflection modulates the intensity of the beam which is reflected from the mirror elements and which ultimately reaches the sensor under test. The reflected beam, now impressed with the image of the manipulated DMD, and thus simulating the appearance of an infrared target, impinges on beamsplitter 307 which transmits it further toward aperture 313. The aperture is of a size which is appropriate for allowing the radiation reflected from undeflected mirror elements to pass through without obstruction while blocking the radiation reflected from fully-deflected mirror elements. An illustration of this is given in FIG. 4, arrows indicating radiation travel paths. Any image of the DMD will show the undeflected mirror element 101a as bright and the fully-deflected mirror element 101b as dark. Intermediate shades of gray may be achieved by deflecting the mirror element partially so that radiation reflected from it is partially eclipsed by the edge of aperture 313, or by controlling the duty factor of the bistable DMD to form a time-averaged shade of gray. Another technique for producing gray levels is to image the DMD with deliberately introduced defocusing or aberration, to blur together small groups of dark and bright mirror elements, resulting in some averaged shade of gray for each group. However, this technique sacrifices spatial resolution for gray level capability.

After passing through aperture 313, the transmitted radiation impinges on collimating lens member 315. Lens member 315 may be a single-element lens, although high optical performance would require a multielement lens to minimize aberrations and distortions in the resulting image. Anti-reflective optical coating on the lens would minimize the high reflective losses associated with the materials commonly used for the fabrication of infrared lenses, such as zinc selenide. Lens member 315 is positioned such that its exit pupil coincides with the entrance pupil of the sensing element of the sensor. The effect is that to infrared sensor 319 positioned at exit pupil 317 of lens member 315 to observe the image of DMD 309, the image will appear to be at infinity. If lens member 315 is mounted to be moved along the optical axis, then the location of the image of DMD can be changed; either closer or farther from sensor 319 which action simulates the interception of a moving target by a guided missile.

Figure 5:
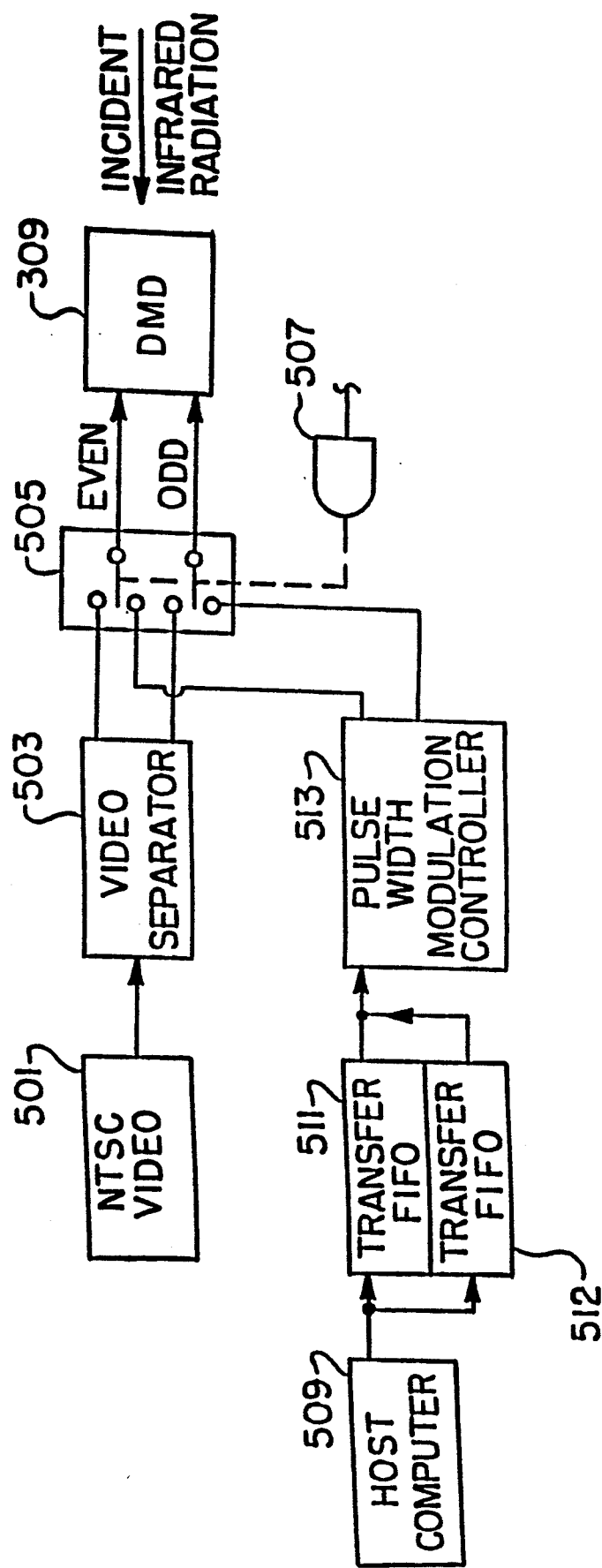
FIG. 5 is a block diagram of the driver electronics which are coupled to the DMD.

The driver electronics circuitry depicted in FIG. 5 shows an interface scheme in which acceptable image data can be generated either by 30 Hz National Television Standards Committee (NTSC) video source 501 or by host computer 509 supporting frame rates in excess of 1000 Hz. The selection as to which image data is input to DMD is made by switch 505 in response to commands received from video/host computer selection control 507. The scene data emanating from NTSC video source 501 is received by video separator 503 which, using the vertical and horizontal sync levels provided by the composite incoming video, produces therefrom an even and an odd DMD input.

When host computer 509 generates the image data which is comprised of even data streams and odd data streams, image data originating at the computer is transferred to and latched by a pair of high speed First-In-First-Out (FIFO) memories 511, 512, for even data stream and for odd data stream, respectively. The latched data is then input from the FIFO memories to pulse width modulation controller 513 which uses the data and determines the duty cycle of the mirror deflection. This determines the duty cycle of the mirror deflection. This approach of using very high frame rates and pulse width modulation is an effective way to achieve a wide range of projected gray levels. By running host computer 509 at frame rates higher than that of the sensor under test and by varying the duty cycle of the binary DMD, mentioned hereinabove, (i.e. each mirror element of the DMD is either fully deflected or not at all), gray scale performance can result as the sensor integrates infrared energy received during its sampling period. The NTSC video source may be a camera, video recorder, or a host computer with a graphics adapter. This variety of sources allows a great degree of flexibility but the sources' usefulness is limited by the 30 Hz frame rate associated with the composite video. Further, attempts to achieve high resolution gray scales using an image data source which runs at a standard 30 Hz frame rate may require the use of high speed processors and compensation tables. These are needed to correct the problems associated with variations in mirror bias, spring constant and linearity across the array of mirror elements of a DMD. This method requires frequent calibration and the excessive computational overhead associated with signal compensation may ultimately place a limit on usable frame rate. The use of direct memory transfers of image data from a host computer limits the choice of image data source, but it allows realization of the DMD's full frame rate potential.

Although a particular embodiment and form of this invention has been illustrated, it is apparent that various modifications and embodiments of the invention may be made by those skilled in the art without departing from the scope and spirit of the foregoing disclosure.

Figure 6:
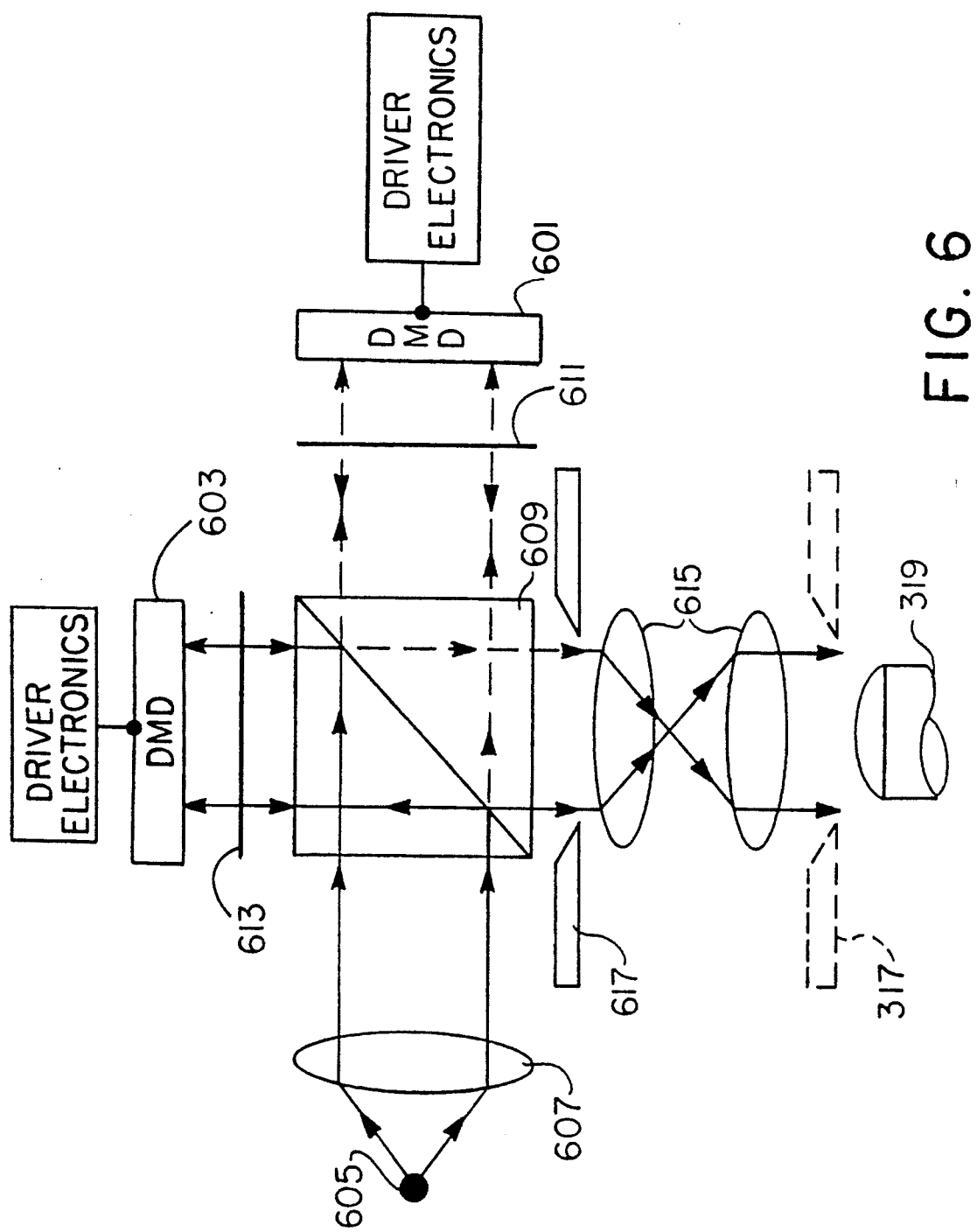
FIG. 6 shows an embodiment of the infrared image projector incorporating two DMD's.

One such modification is shown in FIG. 6 which depicts an infrared image projector incorporating two DMD's 601, 603. In this embodiment, radiation from broadband source 605 impinges on and is collimated by lens 607. Thence, the collimated beam proceeds to beamsplitter cube 609 which, being partially reflective, reflects a portion of the beam to DMD 603 through spectral filter 613 and transmits another portion of the beam to impinge on DMD 601 through spectral filter 611. Spectral filters 611 and 613 are chosen so that the beam finally impinging on DMD 603 is of different wavelength than the beam finally impinging on DMD 601. The mirror elements of DMD's 601 and 603 are manipulated in the same manner as are the mirror elements of the DMD depicted in FIG. 3. DMD's 601 and 603 reflect the radiation, a part of which is transmitted through and another part of which is reflected by the beamsplitter cube 609 as indicated by the various dotted and solid line arrows. The reflected and transmitted beams which pass through aperture 617 and impinge on achromatic imaging optics 615 are collimated by the imaging optics. The sensor under test is positioned at the exit pupil 317 of the imaging optics and perceives the image projected by the collimated beam as an infrared target at infinity.

Figure 7:
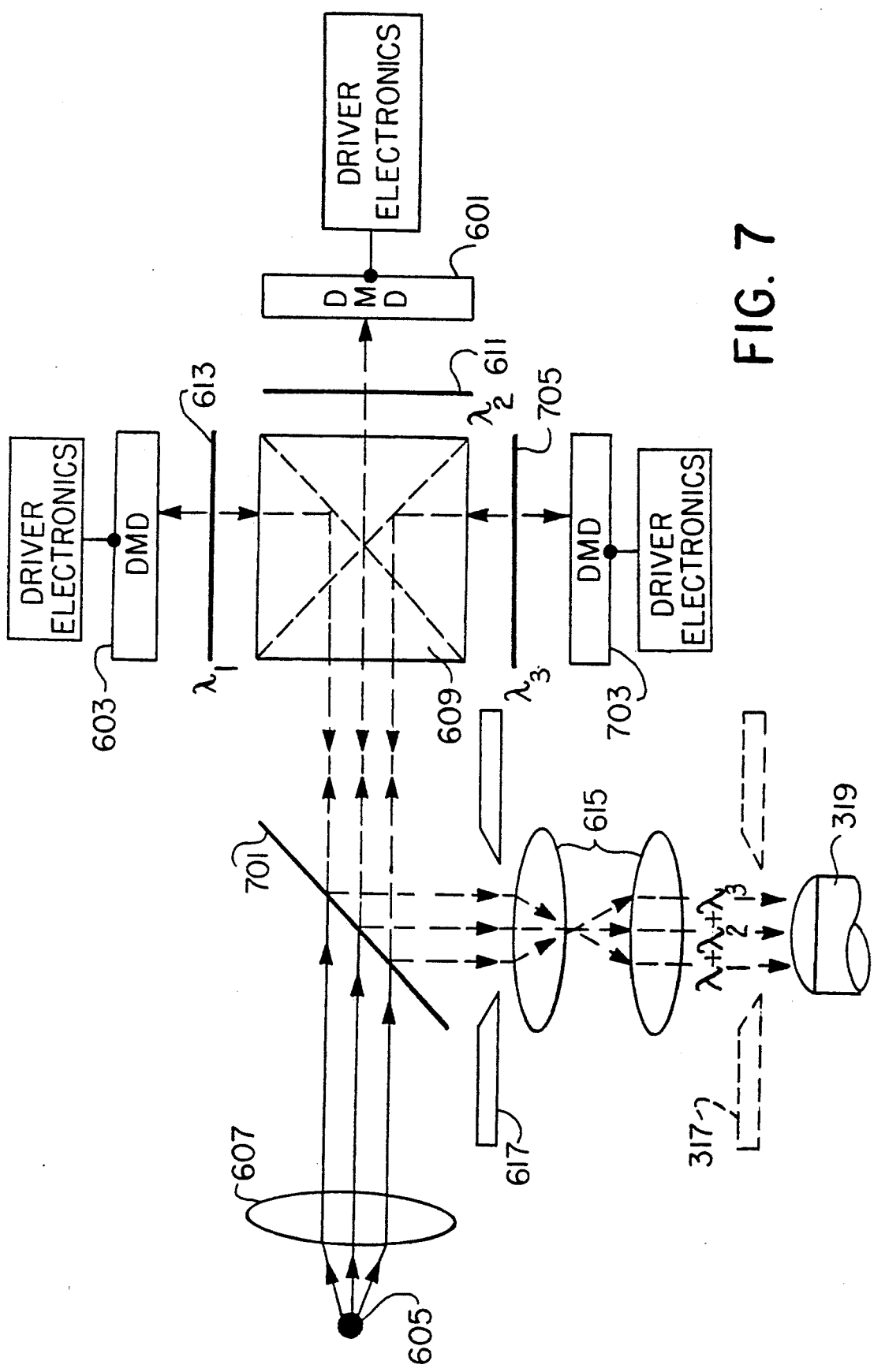
FIG. 7 is an illustration of the image projector incorporating three DMD's.

FIG. 7 shows an infrared image projector using even more DMD's. The same principles and mechanics which were used to explain the operation of the projector depicted in FIG. 6 are applicable to the operation of the projector incorporating three DMD's. The only features that distinguish the embodiment of FIG. 7 from the embodiment of FIG. 6 are beamsplitter 701, additional DMD 703 and its corresponding spectral filter 705. Beamsplitter 701 directs toward aperture 617 radiation reflected from undeflected mirror elements of DMD's 601, 603 and 703. Spectal filter 705 allows only radiation of a selected wavelength to impinge on DMD 703. The use of multiplicity of DMD's allows a more realistic representation of the imaged object. The infrared image projector described herein can modulate a 128×128 mirror element array but, of course, this resolution can easily be improved as the DMD technology improves. Accordingly, the invention should be limited only by the claims appended hereto.

We claim:

1. An infrared image projector, said projector comprising: a source of infrared radiation, a plurality of deformable mirror devices for reflecting infrared radiation incident thereon from said source, each of said devices being comprised of an array of mirror elements, and the individual mirror elements each being deflectable by pre-determined angles independently of any other mirror element; a means for deflecting the individual mirror elements by said pre-determined angles; an aperture of a suitable size, said aperture being appropriately positioned to transmit therethrough a controlled amount of the radiation reflected from said mirror devices; a means for distributing incoming radiation from said source to be incident on said mirror devices and for directing the reflected radiation from said mirror devices to said aperture for further transmission to be imaged.

2. In an infrared image projector, having an infrared radiation source and at least one deformable mirror device for reflecting infrared radiation incident thereon to produce an infrared image, said deformable mirror device being comprised of a plurality of independently deflectable mirror elements, a device for deflecting said mirror elements to achieve desired gray levels in the image, comprising; a source of image data, said source being capable of supporting high frame rates; a means for receiving said image data from said source and producing therefrom an even data stream and an odd data stream; a pulse width modulator, said modulator being coupled to said image data receiving means to accept said data streams therefrom and modulate said data streams to determine the duty cycle of the deflection of said mirror elements; a coupling means positioned between said modulator and said deformable mirror device for coupling said modulated data streams to said deformable mirror device to effect deflection of the mirror elements in accordance with said duty cycle.

3. A deflecting device as set forth in claim 2, wherein said image data source comprises a computer, said computer supporting frame rates in excess of 1000 Hz; and said image data receiving and producing means comprises a pair of first-in-first-out memory buffers, said buffers being coupled to said computer for receiving direct memory transfers of image data therefrom and latching said memory transfers.

* * * * *